United States Patent Office 2,893,813
Patented July 7, 1959

2,893,813
INDO-CARBON BLACK DYESTUFF COMPOSITIONS

Harvey Gurien, Cranford, and Robert E. Brouillard, and Charles W. C. Stein, Westfield, N.J., assignors to General Aniline & Film Corporation, New York, N.Y., a corporation of Delaware No Drawing. Application July 31, 1956
Serial No. 601,124

12 Claims. (Cl. 8—37)

This invention relates to emulsions of indo-carbon black dyestuffs, and particularly to a method of preparing such dyestuffs of high concentration.

Sulfur dyestuffs of the indo-carbon black type have long been recognized in the art for their low cost compared to most other dyes, combined with good fastness properties in all respects except chlorine fastness. Hence a large commercial usage has grown up for those purposes in which contact with chlorine or other oxidizing agents is of minor or insignificant consideration.

The manufacture of such dyestuffs has heretofore been carried out by the thionation of indophenol intermediates, a slow, time-consuming operation, which was followed by aeration, oxidation and filtration operations. Each of these steps, in addition to being time consuming, resulted in a marked degradation of the product as evidenced by large losses in yield and color value of the dye produced. In addition considerable expense was involved in the labor of handling the presscake and controlling the longer reaction cycle.

The application of these dyestuffs in the past has required a pre-reduction of the dyestuff in the bath with aqueous sodium sulfide before being applied to the fiber, a step which requires time and additional mixing equipment and results in considerable loss of color due to instability. Other disadvantages of the paste and powder forms include difficulty in standardization and dusting of the powder forms.

Concentrated aqueous liquid solutions of sulfur dyes are much preferred to paste or powder forms because they may be completely formulated by the manufacturer to include all necessary ingredients for the dye bath. In this day the dyer need only dilute to the desired strength with water and the solution formed is ready to be used. Accurate standardization may be obtained since the manufacturer has a more fundamental control of the production processes. Handling difficulties with pastes and powders are simplified and rendered much cleaner and dust free.

In the preparation of the aforesaid liquid sulfur dyes, several methods have been proposed. One method starts with the finished oxidized sulfur dyestuff and solubilizes it with the reaction of aliphatic straight chain amines. Another method involves the reaction of the sulfurized dyestuff with specific ratios of sodium sulfide and hydrosulfide of 1:1, 2:1, respectively. It is claimed that the solution of the dyestuff is less alkaline and of a lower pH than solutions in sodium sulfide or sodium sulfide with added alkali. Still another method involves the production of the dyestuff in the presence of a solubilizing agent such as, for example, sodium sulfonates of toluene, xylene, cymene, dimethyl aniline and tetrahydronaphthalene in the presence of an alkali ether of mono- or diethylene glycol. Other methods include the heating of the dyestuff with monoalkylol amines until reduced and solubilized; the employment of water miscible hydroxy aliphatic compounds of one to four carbon atoms, such as methanol, propanol, glycerine, ethylene glycol, ethylene glycol monoethyl ether and the like in the presence of sodium sulfide and caustic soda; and by heating an aqueous suspension of the dyestuff with sufficient amounts of sodium hydrosulfide and sodium polysulfide to form a true solution having an alkalinity about 1% calculated as caustic soda.

In some of these methods the resulting liquid solution must be filtered or centrifuged to clarify the liquid dye.

It is an object of the present invention to provide an emulsion of an indophenol sulfurized-vat dyestuff of the indo-carbon black type which is stable and ready for dyeing.

Another object is to provide a process of preparing such emulsion.

Other objects and advantages will become manifest from the following description:

We have found that an indophenol sulfurized-vat dyestuff in a stable emulsion form can be made directly from the indophenol base material without resorting to filtration or isolation of any kind, producing a ready to dye liquid in high concentration, which can be applied directly to the fiber. The emulsion has the advantage over ordinary liquid sulfur dyes in that the active dyestuff composition is concentrated in one phase of the emulsion. It is stable to oxidation due to the decreased surface area involved. In fact it is more stable than true solutions. In the case of true solutions the surface area is at a maximum due to the state of molecular dispersion. This feature alone is of great importance in dealing with sulfur dyestuffs which are known to be readily oxidized with consequent loss of color value, even when the dyestuff is in the unreduced state as prepared in the past. Another significant advantage of the emulsion is that no difficulty is experienced with separation on cooling, or salting out, which is the common shortcoming of true solutions.

In accordance with the process of the present invention the indophenol sulfurized-vat dyestuff is prepared in situ without the use of sodium hydrosulfide. The pH values are relatively high and range from 10.0 to 12.5. Inasmuch as the dyestuff is prepared in situ the time consuming and costly step of isolating the press cake, following filtration or centrifuging, and treating it with aqueous sodium sulfide and sodium hydrosulfide is completely eliminated.

In practicing the present invention, the following base materials are mixed and refluxed for thirty-six hours. All parts are by weight:

| | |
|---|---|
| 4-hydroxy-phenyl-2-naphthylamine | 35–55 |
| Water | 40–60 |
| Water miscible hydroxy or dihydroxy aliphatic compound or aliphatic alkoxy alcohol containing from 2 to 10 carbon atoms | 40–60 |
| Caustic soda flakes | 5–60 |
| Sodium sulfide | 10–30 |
| Sulfur | 75–100 |
| Ionic or non-ionic surface active agent | 5–20 |

The mixture, after refluxing, is cooled to room temperature and 2 parts of the mass diluted with 1 part of 10% aqueous sodium sulfide solution. The pH ranges from 10.0 to 12.5, and the alkalinity is greater than 1% calculated as caustic soda. The resulting aqueous emulsion dyes cotton directly deep black shades.

The water miscible hydroxy or dihydroxy aliphatic compound or alkoxy or aliphatic alkoxy alcohol is an essential component of the base material mixture in that it aids emulsification in conjunction with the ionic or non-ionic surface active agent. As examples of such hydroxy, dihydroxy aliphatic compounds and aliphatic alkoxy alcohols, the following may be mentioned:

Methyl alcohol
Ethyl alcohol
Propyl alcohol
Isopropyl alcohol
Butyl alcohol
Amyl alcohol
2- or 3-pentanol
1-hexanol
1-heptanol
Butoxyethanol
Amyloxy ethanol
Hexyloxy ethanol
Ethylene glycol
Propylene glycol
Trimethylene glycol
Tetramethylene glycol
Hexamethylene glycol
Decamethylene glycol
Ethylene glycol monomethyl ether
Ethylene glycol monoethyl ether
Ethlyene glycol monopropyl ether
Ethylene glycol monobutyl ether
Ethylene glycol monoamyl ether
Ethylene glycol monohexyl ether
Ethylene glycol monooctyl ether and the corresponding monoalkyl ethers of diethylene glycol
Dipropylene glycol The nature or character of the ionic and non-ionic surface active agents is immaterial so long as they are capable of emulsifying the reaction product resulting from the base materials. Surface active agents of this type include the following:

Ionic—
  Alkylaryl sulfonates of more than 7 carbon atoms
  Alkyl sulfates of fatty alcohols
  Condensation products of sulfonated naphthalenes with formaldehyde
  Sulfonated amides and amines of fatty acid groups, and sulfonated esters and ethers
  Sodium salts of fatty acids
Non-ionic—
  Fatty acid esters and ethers
  Fatty alcohol ethers
  Alyky aryl polyglycol ethers
  Ethoxylated fatty acid amides In view of the foregoing classification no difficulty will be experienced by those skilled in the art in making a proper selection of either one or both types, since all of the surface active agents now available on the open market and classified either as ionic or non-ionic are useful for the purpose of the present invention. A few typical examples, however, may be mentioned, and in this regard they include the sodium salts of mono- and dialkyl substituted alkali sulfonates of 9 or more carbons, dodecylbenzene sulfonate, condensation products of fatty acid chlorides of isethionic acid, the sodium salts of mono acid polyakyldated benzene sulfonates, sodium lauryl sulfate, allyl sodium sulfate, poly(2-ethyl hexyl) phosphate, sulfonated mineral oils produced from petroleum distillates and having high molecular weight hydrocarbons with at least one sulfonic acid group and molecular weights of 400–530, etc., esters of oleic, stearic and palmitic acids with polyhydroxy alcohols; polyoxyethylene derivatives of polyhydroxy alcohols; polyoxyethylene ethers of polyhydroxy alcohols, and the like.

The following examples are illustrative of the process of preparing emulsions of the indophenol sulfurized-vat dyestuff. It is to be clearly understood that these examples are merely illustrative and are not to be construed as being limitative.

All of the parts given are by weight.

Example I

In a suitable vessel equipped with a refluxing condenser, the following components were added in the order given: 45 parts 4-hydroxy-2-naphthylamine, 40 parts of water, 40 parts of ethylene glycol mono ethyl ether, 5 parts of caustic soda flakes, 10 parts of sodium sulfide, 75 parts of sulfur, and 10 parts of condensation product of formaldehyde and sodium naphthalene sulfonate.

The mixture was refluxed for 36 hours and then cooled to room temperature. Two parts of the resulting mass were diluted with one part of 10% aqueous sodium sulfide solution. The resulting aqueous emulsion having a pH of 11.0 dyed cotton directly deep black shades. It contains parts of dyestuff, parts of sodium sulfide and 40 parts of ethylene glycol mono ethyl ether. The emulsion is ready for use by the dyer, and need not be filtered, centrifuged or otherwise clarified.

Example II

In a two liter flask equipped with a refluxing condenser, the following components were added in the order given: 45 parts of 4-hydroxypenyl-2-naphthylamine, 45 parts of water, 45 parts of ethylene glycol, 10 parts of caustic soda flakes, 15 parts of sodium sulfide, 85 parts of sulfur, 15 parts of sodium lignin sulfonates, purchased on the open market under the brand name of Marasperse.

After refluxing, the mixture was cooled to room temperature and two parts of the resulting mass diluted with one part of 10% aqueous sulfide solution. The aqueous emulsion has a pH of 10.5 and dyes cotton directly in deep black shades.

Example III

In a flask equipped with a refluxing condenser, the following components were added in the order given, and the mixture refluxed for 36 hours: 45 parts of 4-hydroxyphenyl-2-naphthylamine, 50 parts of water, 50 parts of dipropylene glycol, 25 parts of caustic soda flakes, 20 parts of sodium sulfide, 90 parts of sulfur, and 15 parts of ethoxylated nonylphenol containing 9 ethoxy groups per molecule.

After refluxing, the mixture was cooled to room temperature and 2 parts of the resulting mass diluted with 10% of aqueous sulfide solution. The aqueous emulsion has a pH of 11.8 and dyed cotton directly to deep black shades.

Example IV

Example III was repeated with the exception that 50 parts of dipropylene glycol were replaced by 50 parts of butoxyethanol.

Example V

The following ingredients were placed in a suitable kettle: 47 parts of 4-hydroxy-2-naphthylamine, 49 parts of water, 49 parts of butanol, 51 parts of caustic soda flakes, 20 parts of sodium sulfide, 100 parts of sulfur and 15 parts of polyoxyethylene sorbitan monooleate.

The kettle was closed and heated to reflux (120–125° C.) and held at reflux for 36 hours during which time hydrogen sulfide was slowly evolved. Thereafter the reaction mass was allowed to cool at 35–60° C. and 2 parts of the mass was diluted with 1 part of 10% aqueous sodium sulfide solution, and the resulting emulsion allowed to cool to room temperature. The resulting aqueous emulsion having a pH of 11.1 dyes cotton directly in deep black shades.

The emulsions prepared in accordance with the present invention will contain, inter alia, from 20 to 30 parts by weight of the dyestuff and from 2 to 10 parts by weight of sodium sulfide per 100 parts of ready-to-dye emulsion.

We claim:

1. A ready to dye sulfur dyestuff in stable aqueous emulsion form comprising 20 to 30 parts by weight of an indophenol sulfur dye of p-hydroxyphenyl-β-naphthylamine in reduced form, 5–15 parts by weight of an aliphatic hydroxy compound containing from 1 to 10 carbon atoms and selected from the group consisting of aliphatic mono- and di-alkanols, alkoxy alkanols, ethylene glycol monoalkyl ethers and diethylene glycol monoalkyl ethers, 5–20 parts by weight of a surface active agent selected from the class consisting of ionic and non-ionic surface active agents, and from 2 to 10 parts by weight of sodium sulfide.

2. A ready to dye sulfur dyestuff according to claim 1 wherein the aliphatic hydroxy compound is ethylene glycol monoethyl ether.

3. A ready to dye sulfur dyestuff according to claim 1 wherein the aliphatic hydroxy compound is ethylene glycol.

4. A ready to dye sulfur dyestuff according to claim 1 wherein the aliphatic hydroxy compound is dipropylene glycol.

5. A ready to dye sulfur dyestuff according to claim 1 wherein the aliphatic hydroxy compound is butoxyethanol.

6. A ready to dye sulfur dyestuff according to claim 1 wherein the aliphatic hydroxy compound is butanol.

7. A process of preparing a ready to dye fluid sulfur dyestuff in stable emulsion form which comprises heating at reflux 35–55 parts by weight of p-hydroxyphenyl-$\beta$-naphthylamine in the presence of 40–60 parts by weight of water, 40–60 parts by weight of an aliphatic hydroxy compound containing from 1 to 10 carbon atoms and selected from the group consisting of aliphatic mono- and di-alkanols, alkoxy alkanols, ethylene glycol monoalkyl ethers and diethylene glycol monoalkyl ethers, 5–60 parts by weight of caustic soda, 10–30 parts by weight of sodium sulfide, 75–100 parts by weight of sulfur and from 5–20 parts by weight of a surface active agent selected from the class consisting of ionic and non-ionic surface active agents, cooling the heated mass and diluting two parts by weight thereof with 1 part by weight of 10% aqueous sodium sulfide solution.

8. The process according to claim 7 wherein the aliphatic hydroxy compound is ethylene glycol monoethyl ether.

9. The process according to claim 7 wherein the aliphatic hydroxy compound is ethylene glycol.

10. The process according to claim 7 wherein the aliphatic hydroxy compound is dipropylene glycol.

11. The process according to claim 7 wherein the aliphatic hydroxy compound is butoxyethanol.

12. The process according to claim 7 wherein the aliphatic hydroxy compound is butanol.

References Cited in the file of this patent

UNITED STATES PATENTS 2,657,112  Robinson et al. _____ Oct. 27, 1953

OTHER REFERENCES

Remington's Practice of Pharmacy, Cook and Martin, 9th ed., pp. 592–595.

UNITED STATES PATENT OFFICE

CERTIFICATE OF CORRECTION

Patent No. 2,893,813

July 7, 1959

Harvey Gurien et al.

It is hereby certified that error appears in the printed specification of the above numbered patent requiring correction and that the said Letters Patent should read as corrected below.

Column 2, line 6, for "about" read -- above --; column 3, line 52, for "or both" read -- of both --; line 61, for "polyakyldated" read -- polyalkylated --; column 4, line 22, for "4-hydroxypenyl" read -- 4-hydroxyphenyl --.

Signed and sealed this 31st day of May 1960.

(SEAL)
Attest:

KARL H. AXLINE
Attesting Officer

ROBERT C. WATSON
Commissioner of Patents